United States Patent
Jeong et al.

(10) Patent No.: US 10,023,070 B2
(45) Date of Patent: Jul. 17, 2018

(54) BATTERY OPERATING APPARATUS, AUXILIARY BATTERY UNIT AND BATTERY CONTROL METHOD

(71) Applicant: Samsung Electronics Co., Ltd., Suwon-si (KR)

(72) Inventors: Ji-young Jeong, Hwaseong-si (KR); YoungJae Kim, Seoul (KR); Hyosun Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/425,132

(22) Filed: Feb. 6, 2017

(65) Prior Publication Data

US 2018/0093582 A1 Apr. 5, 2018

(30) Foreign Application Priority Data

Oct. 5, 2016 (KR) .......................... 10-2016-0128347

(51) Int. Cl.
*H02P 27/04* (2016.01)
*B60L 11/18* (2006.01)
(Continued)

(52) U.S. Cl.
CPC ....... *B60L 11/1868* (2013.01); *B60L 11/1851* (2013.01); *B60L 11/1879* (2013.01);
(Continued)

(58) Field of Classification Search
CPC . B60K 1/00; B60K 6/20; B60W 10/24; H02P 1/00; H02P 6/00; H02P 27/04; H02P 27/06; H02P 41/00; H02P 27/00; B60L 3/0046; B60L 3/12; B60L 3/0038; B60L 11/1809; B62M 7/02; F25B 27/00; H05K 7/20; B60H 1/32; H01M 6/50; H01M 10/00; H01M 10/44
(Continued)

(56) References Cited

U.S. PATENT DOCUMENTS 3,816,805 A * 6/1974 Terry .................... H02J 7/1423
307/16
5,488,283 A * 1/1996 Dougherty .......... B60L 11/1855
307/10.1
(Continued)

FOREIGN PATENT DOCUMENTS

| JP | 10-80006 A | 3/1998 |
| JP | 2009-259408 A | 11/2009 |
| KR | 10-1393275 B1 | 5/2014 |
| KR | 10-1438706 B1 | 9/2014 |
| KR | 10-1542664 B1 | 8/2015 |

*Primary Examiner* — Antony M Paul
(74) *Attorney, Agent, or Firm* — NSIP Law

(57) ABSTRACT

A battery operating apparatus, an auxiliary battery unit, and a battery control method are provided. The battery operating apparatus includes a master battery manager (BM), a fixed battery unit configured to supply a fixed power to a load, the fixed power remaining unchanged over time, and a removable auxiliary battery unit configured to supply a variable power to the load, the variable power varying over time, wherein the master BM is configured to control the fixed battery unit to supply the fixed power among a power needed by the load, and to control the auxiliary battery unit to supply the variable power among the power needed by the load.

19 Claims, 6 Drawing Sheets

(51) Int. Cl.
*H02J 7/00* (2006.01)
*B60R 16/033* (2006.01)
*H02J 7/34* (2006.01)
*H02J 1/00* (2006.01)

(52) U.S. Cl.
CPC .......... *B60R 16/033* (2013.01); *H02J 7/0014* (2013.01); *H02J 7/34* (2013.01); *B60L 2210/10* (2013.01); *B60L 2240/14* (2013.01); *B60L 2240/54* (2013.01); *H02J 2001/008* (2013.01)

(58) Field of Classification Search
USPC .............. 318/3, 139, 400.01, 700, 800, 801; 180/65.1, 65.21, 65.29, 65.31, 207.3; 320/106, 112, 127
See application file for complete search history.

(56) References Cited

U.S. PATENT DOCUMENTS

| | | | | |
|---|---|---|---|---|
| 5,783,872 | A * | 7/1998 | Blair | B60L 11/1809 307/46 |
| 2005/0257546 | A1* | 11/2005 | Ishishita | B60L 3/0023 62/236 |
| 2012/0034507 | A1* | 2/2012 | Harada | B60L 11/1874 429/120 |
| 2014/0312828 | A1 | 10/2014 | Vo et al. | |
| 2016/0250928 | A1* | 9/2016 | Matsuda | B60L 3/003 701/22 |
| 2016/0325636 | A1* | 11/2016 | Masuda | B60L 11/1853 |
| 2017/0305292 | A1* | 10/2017 | Minamiura | B60L 11/1874 |

* cited by examiner

BATTERY OPERATING APPARATUS, AUXILIARY BATTERY UNIT AND BATTERY CONTROL METHOD

CROSS-REFERENCE TO RELATED APPLICATION(S)

This application claims the benefit under 35 USC § 119(a) of Korean Patent Application No. 10-2016-0128347, filed on Oct. 5, 2016, in the Korean Intellectual Property Office, the entire disclosure of which is incorporated herein by reference for all purposes.

BACKGROUND

1. Field

The following description relates to a battery operation apparatus, an auxiliary battery unit, and a battery control method.

2. Description of Related Art

An electric vehicle (EV) is driven by a motor that uses a capacitor or a battery as a power source. A hybrid vehicle is driven by an engine that uses a fuel, for example, gasoline, along with a motor that uses a battery as a power source. Generally, a battery is included in a vehicle that uses the battery as a power source, and the battery is charged using a charger. Because the battery is charged in a charging station with a charger, there is a limitation to a place. When a battery is installed in an EV and another battery having different characteristic from that of the installed battery is added to the EV, one of the batteries may need to be replaced due to an end of a life of the battery. Accordingly, there is a desire for a technology for increasing a replacement cycle of a battery and for efficiently utilizing the battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a battery operating apparatus including a master battery manager (BM), a fixed battery unit configured to supply a fixed power to a load, the fixed power remaining unchanged over time, and a removable auxiliary battery unit configured to supply a variable power to the load, the variable power varying over time, wherein the master BM is configured to control the fixed battery unit to supply the fixed power among a power needed by the load, and to control the auxiliary battery unit to supply the variable power among the power needed by the load.

The load may include a motor of an electric vehicle (EV), and wherein the master BM may be configured to control the auxiliary battery unit to discharge a power used to accelerate the EV, control the auxiliary battery unit to perform charging with a power generated by decelerating the EV, and control the fixed battery unit to discharge a power at a c-rate disregarding the accelerating and the decelerating of the EV.

The master BM may be configured to adjust the c-rate based on a speed of the EV.

The auxiliary battery unit may include a slave BM, a direct current (DC)-to-DC (DC/DC) converter, a DC-to-alternating current (AC) (DC/AC) inverter, and a battery module, wherein in response to the master BM determining that the removable auxiliary battery unit is included in an electric vehicle (EV), the slave BM may be connected to the master BM and the DC/DC converter, the DC/DC converter may be connected to the battery module and the load, and the slave BM may be configured to control the DC/DC converter to supply a power output from the battery module to the load.

The DC/DC converter may be configured to supply the power output from the battery module to the load using a voltage of the fixed battery unit.

The DC/DC converter may include output ports with different voltages, and the DC/DC converter is configured to supply the power output from the battery module to the load using an output port with a voltage of the fixed battery unit.

In response to the master BM determining that the removable auxiliary battery unit is removed from the EV and connected to an AC load, the slave BM may be connected to the DC/AC inverter, the DC/AC inverter may be connected to the battery module and the second load, the slave BM may be configured to control the DC/AC inverter to supply the power output from the battery module to the AC load, and the DC/AC inverter may be configured to supply the power output from the battery module to the AC load using a rated voltage of the AC load.

The DC/DC converter may include output ports with different voltages, and wherein in response to the master BM determining that the removable the auxiliary battery unit is removed from the EV and connected to a DC load, the slave BM may be connected to the DC/DC converter, the DC/DC converter may be connected to the battery module and the second load, the slave BM may be configured to control the DC/DC converter to supply the power output from the battery module to the DC load, and the DC/DC converter may be configured to supply the power output from the battery module to the DC load using an output port with a rated voltage of the DC load.

In response to the master BM determining that the removable auxiliary battery unit is included in an electric vehicle (EV), the removable auxiliary battery unit may be configured to supply a power to a heating apparatus configured to maintain a temperature of the fixed battery unit to be higher than or equal to a threshold.

In another general aspect, there is provided a removable auxiliary battery unit including a slave battery management system (BM), a direct current (DC)-to-DC (DC/DC) converter, a DC-to-alternating current (AC) (DC/AC) inverter, and a battery module, and wherein in response to the auxiliary battery unit being included in an electric vehicle (EV), the slave BM is connected to the DC/DC converter and a master BM of a battery operating apparatus of the EV, the DC/DC converter is connected to the battery module and a load of the EV, and the slave BM is configured to control the DC/DC converter to supply a variable power to the load, the variable varying over time.

The DC/DC converter may be configured to supply a power output from the battery module to the load using a voltage of a fixed battery unit of the EV.

The master BM may be configured to control a fixed battery unit of the EV to supply a fixed power to the load, the fixed power remaining unchanged over time.

The load may include a motor of the EV, wherein the slave BM may be configured to control the DC/DC converter to supply a power used to accelerate the EV, and control the DC/DC converter to perform charging with a power generated by decelerating the EV, and wherein the master BM may be configured to control a fixed battery unit of the EV to discharge a power at a c-rate disregarding the accelerating and the decelerating of the EV.

The DC/DC converter may include output ports with different voltages, and the DC/DC converter may be configured to supply a power output from the battery module to the load using an output port with a voltage of a fixed battery unit of the EV.

In response to the master BM determining that the removable auxiliary battery unit is removed from the EV and connected to an AC load, the slave BM may be connected to the DC/AC inverter, the DC/AC inverter may be connected to the battery module and the second load, the slave BM may be configured to control the DC/AC inverter to supply a power output from the battery module to the AC load, and the DC/AC inverter may be configured to supply the power output from the battery module to the AC load using a rated voltage of the AC load.

The DC/DC converter may include output ports with different voltages, and wherein in response to the master BM determining that the removable auxiliary battery unit is removed from the EV and connected to a DC load, the slave BM may be connected to the DC/DC converter, the DC/DC converter may be connected to the battery module and the second load, the slave BM may be configured to control the DC/DC converter to supply a power output from the battery module to the DC load, and the DC/DC converter may be configured to supply the power output from the battery module to the DC load using an output port with a rated voltage of the DC load.

The auxiliary battery unit of claim 10, wherein in response to the master BM determining that the removable auxiliary battery unit is included in the EV, the slave BM may be configured to control the DC/DC converter to supply a power to a heating apparatus configured to maintain a temperature of a fixed battery unit of the EV to be higher than or equal to a threshold.

In another general aspect, there is provided a battery control method including determining whether a removable auxiliary battery unit is included in an electric vehicle (EV), controlling a fixed battery unit to supply a fixed power to a load, the fixed power remaining unchanged over time among a power needed by the load, and controlling the auxiliary battery unit to supply a variable power to the load, the variable power varying over time among the power needed by the load, in response to the removable auxiliary battery unit being included in the EV.

The battery control method may include controlling the fixed battery unit to supply the fixed power and the variable power to the load, in response to the removable auxiliary battery unit not being included in the EV.

Other features and aspects will be apparent from the following detailed description, the drawings, and the claims.

Figure 1:
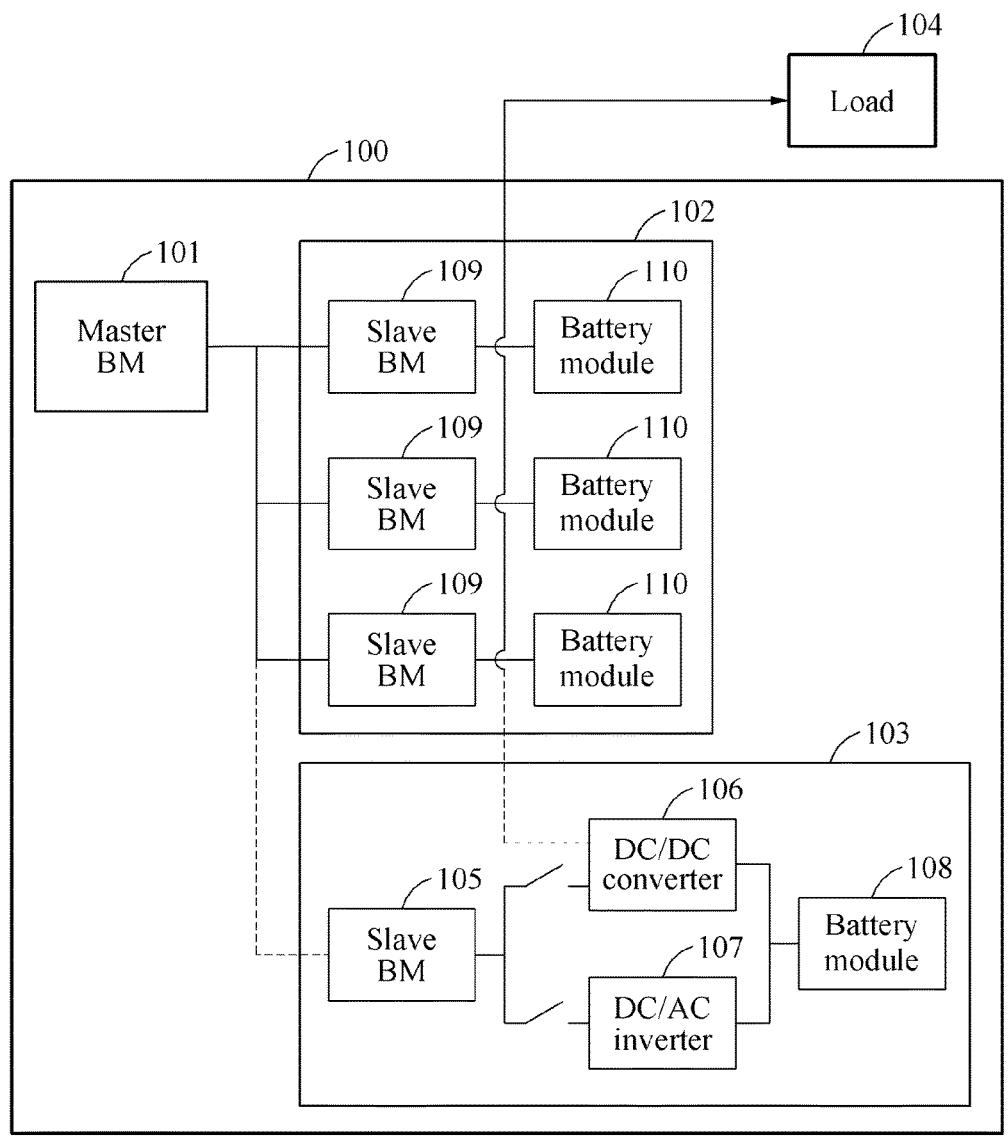
FIG. 1 is a diagram illustrating an example of a battery operating apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or apparatuses described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or apparatuses described herein that will be apparent after an understanding of the disclosure of this application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the following description. It will be understood that when a component is referred to as being "connected to" another component, the component can be directly connected or coupled to the other component or intervening components may be present. As used herein, the singular forms are intended to include the plural forms as well, unless the context clearly indicates otherwise.

FIG. 1 illustrates an example of a battery operating apparatus 100.

Referring to FIG. 1, the battery operating apparatus 100 includes a master battery manager (BM) 101, a fixed battery unit 102, and an auxiliary battery unit 103. The auxiliary battery unit 103 is implemented as, for example, a removable module that is to be included in or removed from the battery operating apparatus 100. The battery operating apparatus 100 is an apparatus for operating a battery and is configured to supply a power to a load 104 using the battery as a power source. The load 104 is a main power consumer to consume a power supplied from an external device, and includes, for example, an electric vehicle (EV) an intelligent vehicle, a hybrid vehicle, appliances, or components in a smart home environment, or a smart building environment that consumes a power using a circuit in which a current flows at a predetermined voltage. The appliances may include home or commercial appliances such as, for example, an electric heater, a washer machine, an electric light, or a drill. For example, when the load 104 is a motor of the EV, the battery operating apparatus 100 including the fixed battery unit 102 may be included in the EV and the auxiliary battery unit 103 may be included in or removed from the EV.

The battery operating apparatus 100 supplies a power to the load 104 by using the fixed battery unit 102 and the auxiliary battery unit 103 as power sources. For example, the master BM 101 controls the fixed battery unit 102 and the auxiliary battery unit 103 to supply a power needed by the load 104. In the following description, a power needed by a load is referred to as a "needed power." A battery manager is an apparatus configured to manage a battery so that the battery is charged or that a power of the battery is discharged. For example, the battery manager is configured to monitor a state of the battery, to maintain an optimized condition for operating the battery, to estimate a time to replace the battery, to detect a problem of the battery, to generate a control signal or command signal associated with the battery, and to control an operation or the state of the battery. The battery operating apparatus 100 determines whether the auxiliary battery unit 103 is included in or removed from the battery operating apparatus 100. When the auxiliary battery unit 103 is included in the battery operating apparatus 100, the battery operating apparatus 100 controls both the fixed battery unit 102 and the auxiliary battery unit 103 to supply the needed power to the load 104. When the auxiliary battery unit 103 is removed from the battery operating apparatus 100, the battery operating apparatus 100 controls the fixed battery unit 102 to supply the needed power to the load 104.

In an example, the fixed battery unit 102 includes a slave BM 109 and a battery module 110. The slave BM 109 controlled by the master BM 101 controls charging or discharging of the battery module 110. The auxiliary battery unit 103 includes a slave BM 105, a direct current (DC)-to-DC (DC/DC) converter 106, a DC-to-alternating current (AC) (DC/AC) inverter 107, and a battery module 108. The slave BM 105 controlled by the master BM 101 controls the DC/DC converter 106 and the DC/AC inverter 107 for charging or discharging of the battery module 108. An example in which the auxiliary battery unit 103 is included in the battery operating apparatus 100 will be described with reference to FIGS. 2 and 3, and an example in which the auxiliary battery unit 103 is removed from the battery operating apparatus 100 will be described with reference to FIGS. 4 and 5.

Figure 2:
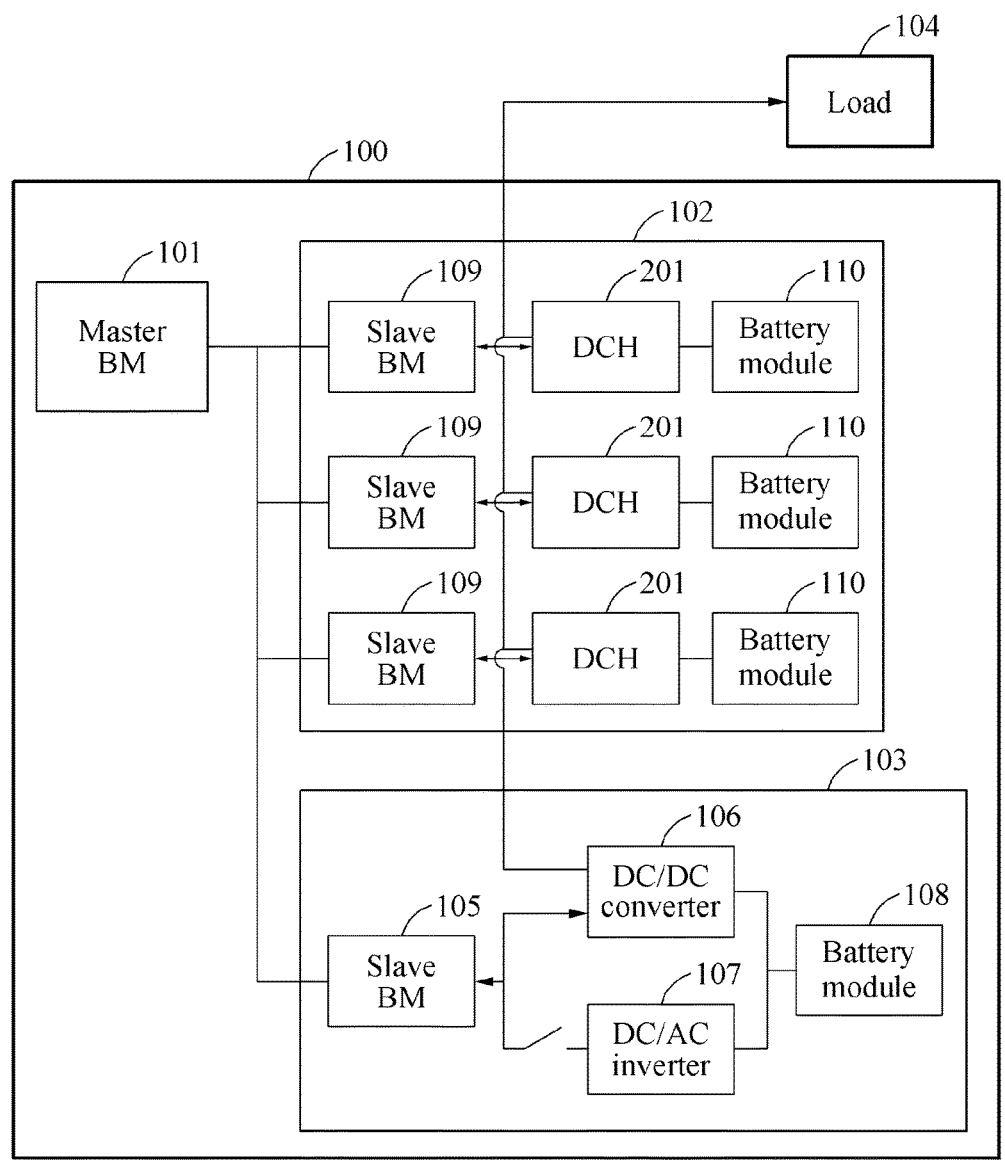
FIG. 2 is a diagram illustrating an example of the battery operating apparatus.

FIG. 2 illustrates an example of the battery operating apparatus 100.

The load 104 receives a power supply from the battery operating apparatus 100, and is, for example, a motor of an EV. The auxiliary battery unit 103 is included in the EV. The master BM 101 determines whether the auxiliary battery unit 103 is included in the EV. When the master BM 101 determines that the auxiliary battery unit 103 is included in the EV while controlling the slave BM 109, the master BM 101 controls the slave BM 105 together with the slave BM 109. The master BM 101 is a main BM configured to control and instruct the slave BMs 105 and 109, and the slave BMs 105 and 109 are subordinate BMs operating based on instructions of the master BM 101.

When the auxiliary battery unit 103 is not included in the EV, the slave BM 109 controlled by the master BM 101 controls the battery module 110 to supply the needed power to the load 104. Referring to FIG. 2, a differential charge handler 201 (hereinafter, referred to as a "DCH 201") controlled by the slave BM 109 is a device for balancing cells of the battery module 110. For example, internal resistances of the cells of the battery module 110 are slightly different from each other. In this example, in response to a change in a current, a voltage deviation among the cells is caused by a difference in the internal resistances. The DCH 201 performs cell balancing to equalize voltages of the cells of the battery module 110.

When the auxiliary battery unit 103 is included in the EV as shown in FIG. 2, the slave BM 105 is connected to the master BM 101 and the DC/DC converter 106. The DC/DC converter 106 is connected to the battery module 108 and the load 104. The slave BM 105 is connected via a wire or wirelessly to the master BM 101 and the DC/DC converter 106 to transmit and receive control signals to and from each of the master BM 101 and the DC/DC converter 106. The DC/DC converter 106 is connected to the battery module 108 and the load 104 to exchange power with each of the battery module 108 and the load 104. The slave BM 105 controlled by the master BM 101 controls the DC/DC converter 106 to supply a power output from the battery module 108 to the load 104. The DC/DC converter 106 supplies the power output from the battery module 108 to the load using a voltage of the fixed battery unit 102 or a rated voltage of the load 104. In an example, the DC/DC converter 106 includes output ports with different voltages. In this example, when the auxiliary battery unit 103 is included in the EV, the DC/DC converter 106 supplies the power output from the battery module 108 to the load using an output port with the voltage of the fixed battery unit 102 or the rated voltage of the load 104. For example, when the DC/DC converter 106 includes an output port OP1 (not shown) for 5 volts (V), an output port OP2 (not shown) for 12 V, an output port OP3 (not shown) for 24 V and an output port OP4 (not shown) for 48 V, and when the voltage of the fixed battery unit 102 is set to 48 V, the DC/DC converter 106 is connected to the fixed battery unit 102 via the OP4 and supplies the power output from the battery module 108 to the load 104.

In an example, when the auxiliary battery unit 103 is included in the EV, the auxiliary battery unit 103 supplies a power to a battery heating apparatus configured to maintain a temperature of the fixed battery unit 102 to be higher than or equal to a predetermined temperature. The battery heating apparatus, although not shown in FIG. 2, may include a circuit configured to set a temperature needed by the fixed battery unit 102 or the battery module 110 to properly supply a power to the load 104. When the auxiliary battery unit 103 is included in the EV, the slave BM 105 controls the DC/DC converter 106 to supply a power to the battery heating apparatus.

When the auxiliary battery unit 103 is included in the EV, the master BM 101 controls the fixed battery unit 102 to constantly supply a power that remains unchanged over time from among the needed power for the load 104. In the following description, the power remaining unchanged over time among the needed power is referred to as a "fixed power." Also, the expression "remaining unchanged over time" indicates that a width of a fluctuation within a predetermined interval is less than a preset value.

The master BM 101 controls the auxiliary battery unit 103 to supply a power that varies over time among the needed power for the load 104. In the following description, the power varying over time is referred to as a "variable power." Also, a variation in the power over time signifies a change in a magnitude of a power. An amount or magnitude of the needed power refers to a physical amount or magnitude that varies over time. For example, the needed power of the load 104 that is the motor of the EV varies in real time while the EV travels. The variable power refers to power other than the fixed power among the needed power, and the fixed power refers to power that remains unchanged over time among needed power that varies over time. For example, when the needed power of the load 104 varies in a range of 60 kilowatts (kW) to 80 kW while the EV travels, the fixed power is 40 kW and the variable power is defined as power obtained by excluding 40 kW from the needed power. In this example, the variable power varies over time in a range of 20 kW to 40 kW. The fixed power is defined in advance as a power with a predetermined magnitude and is adjusted by the master BM 101 or the slave BM 105. Also, the fixed power is variously modified and used based on design intent.

When the load 104 is a motor of the EV, the master BM 101 senses a speed of the EV and controls the fixed battery unit 102 and the auxiliary battery unit 103 based on the sensed speed. In an example, when the EV is accelerated, the master BM 101 controls the slave BM 105 to discharge a variable power for the acceleration. In an example, the master BM 101 controls the slave BM 109 to discharge a power at a c-rate regardless of the accelerating of the EV. In an example, the c-rate is predetermined. The c-rate refers to a current characteristic of a battery indicating a rate of current for charging and discharging of the battery based on a capacity of the battery, and a unit of "C" is used. For example, when a battery (for example, an amount of current to be used for 1 hour) has a capacity of 1,000 milliampere hour (mAh) that is an amount of current to be used for 1 hour, and when a current for charging and discharging is 1 ampere (A), the c-rate is represented by "1 C=1 A/1,000 mAh."

In another example, when the EV is decelerated, the master BM 101 controls the slave BM 105 to charge the battery module 108 with a power generated by the decelerating. In this example, the master BM 101 controls the slave BM 109 to discharge a power to the battery module 108 at a c-rate regardless of the decelerating of the EV. In an example, the c-rate is predetermined. The slave BM 105 charges the battery module 108 based on the needed power reduced over time in response to the EV being decelerated. The slave BM 105 charges the battery module 108 using the DC/DC converter 106 or a separate circuit (not shown) connected to the battery module 108.

The master BM 101 measures an acceleration value of the EV based on the accelerating and decelerating of the EV, and controls the auxiliary battery unit 103 based on whether the measured acceleration value exceeds a threshold. The master BM 101 controls the fixed battery unit 102 so that a power is discharged at a predetermined c-rate regardless of a change in the acceleration value of the EV. When the auxiliary battery unit 103 is included in the EV, a power of the fixed battery unit 102 is discharged at a constant c-rate. Accordingly, a characteristic, for example, a state of health (SOH), of the fixed battery unit 102 is enhanced, and a life and a replacement cycle of the fixed battery unit 102 increase. The SOH is a parameter that quantitatively indicates a change in a capacity of the battery due to an aging effect, and indicates a degree by which the capacity of the battery is degraded. Also, the discharging of the power at the constant c-rate indicates discharging of a power at a c-rate within a predetermined range.

Figure 3:
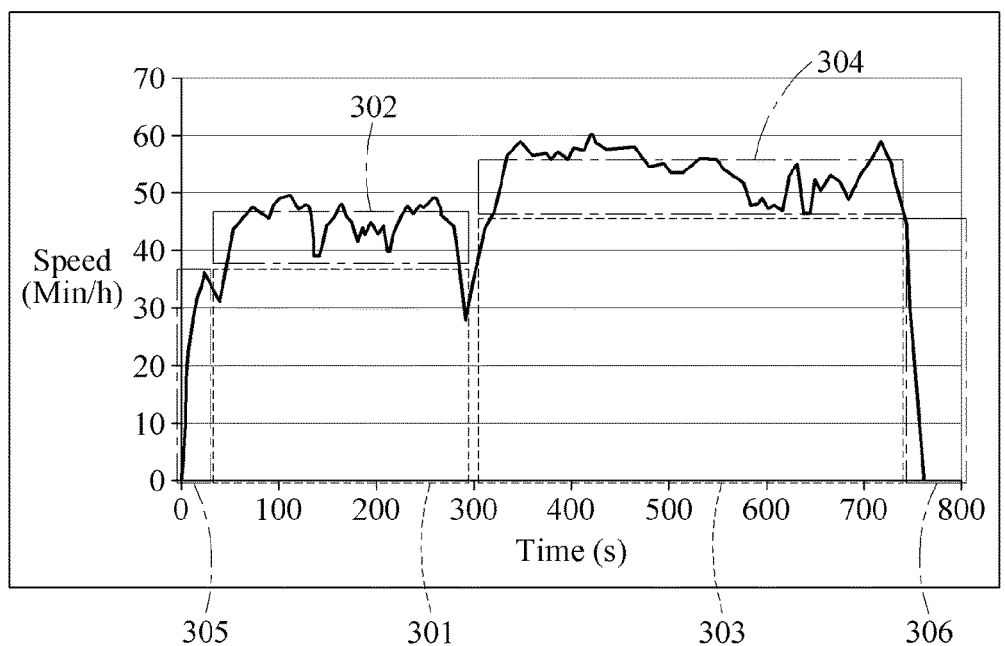
FIG. 3 is a diagram illustrating an example of an operation of controlling a power supply in a battery operating apparatus.

FIG. 3 is a diagram illustrating an example of controlling a power supply in a battery operating apparatus.

Referring to FIG. 3, the master BM 101 controls the fixed battery unit 102 and the auxiliary battery unit 103 to supply the needed power to the load 104 of the EV. A speed of the EV changes over time. The master BM 101 controls the fixed battery unit 102 to supply a power at a predetermined c-rate regardless of a change in the speed over time. For example, the slave BM 109 controls the battery module 110 so that the fixed power of the load 104 is discharged as shown in regions 301 and 303 of the graph of FIG. 3. In the graph, a horizontal axis represents a time and a vertical axis represents the speed of the EV.

The master BM 101 adjusts a c-rate of the fixed battery unit 102 based on the speed of the EV. For example, when a fixed power corresponding to the region 303 is greater than a fixed power corresponding to the region 301, the slave BM 109 adjusts a c-rate at which a power of the battery module 110 is discharged and that corresponds to the region 303 to be greater than a c-rate at which the power of the battery module 110 is discharged and that corresponds to the region 301.

The master BM 101 senses an average speed of the EV during a period of time, and adjusts the c-rate of the fixed battery unit 102 based on the sensed average speed. For example, when an average speed of the EV corresponding to the region 303 is higher than an average speed of the EV corresponding to the region 301, the master BM 101 controls the slave BM 109 based on c-rates corresponding to the average speeds, and the slave BM 109 sets different c-rates of the battery module 110 for the regions 301 and 303.

The master BM 101 controls the auxiliary battery unit 103 to supply a variable power based on the speed that changes over time. For example, the slave BM 105 controls the battery module 108 so that the variable power of the load 104 is discharged as shown in regions 302, 304, 305 and 306 of the graph of FIG. 3. Also, the slave BM 105 controls the battery module 108 so that a power used to accelerate the EV is discharged as shown in the regions 302, 304 and 305, and controls the battery module 108 to perform charging with a power generated by decelerating the EV as shown in the regions 302, 304 and 306.

For example, when a state of the EV is changed from a standstill state to an acceleration state as shown in the region 305, or is changed from the acceleration state to the standstill state as shown in the region 306, the master BM 101 controls the auxiliary battery unit 103 to supply a power used to accelerate the EV, and controls the auxiliary battery unit 103 to perform charging with a power generated by the standstill state. In this example, the slave BM 105 controls the DC/DC converter 106 to supply a power output from the battery module 108 to the load 104 in the acceleration state corresponding to the region 305, and controls the battery module 108 to perform charging with a power generated in the standstill state corresponding to the region 306. Thus, while the EV travels, the master BM 101 repeatedly performs charging and discharging of the auxiliary battery unit 103 instead of the fixed battery unit 102, or performs quick charging and discharging of the auxiliary battery unit 103 instead of the fixed battery unit 102, and the fixed battery unit 102 supplies a constant amount of power. Thus, a life and a replacement cycle of the fixed battery unit 102 increase.

Figure 4:
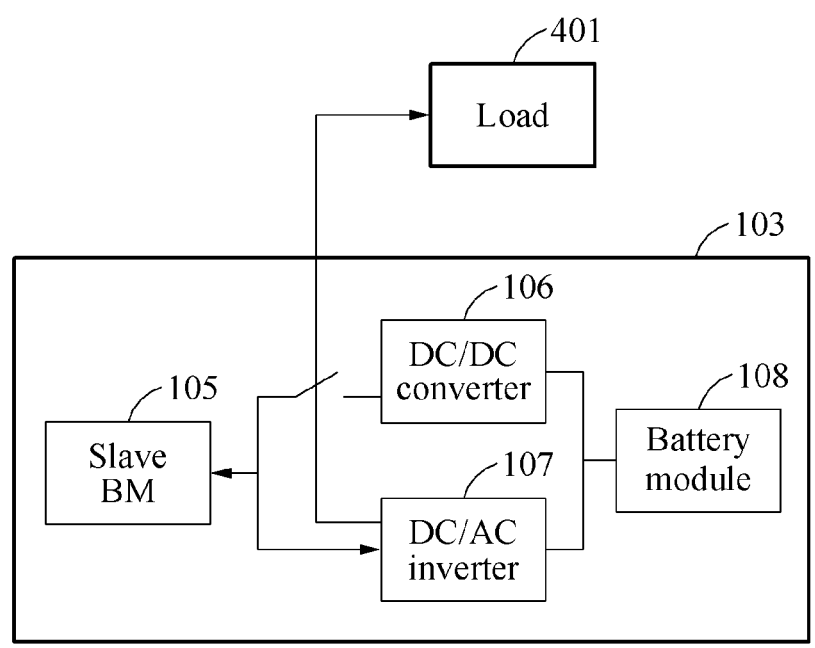
FIG. 4 is a diagram illustrating an example of an auxiliary battery unit.

FIG. 4 illustrates an example of the auxiliary battery unit 103.

As described above with reference to FIGS. 1, 2 and 3, the auxiliary battery unit 103 may be included in or removed from an EV. In an example, the auxiliary battery unit 103 removed from the EV is utilized as an energy storage system (ESS). The auxiliary battery unit 103 utilized as the ESS supplies a stored power to the load 401 as needed.

When the auxiliary battery unit 103 is connected to a load 401 and when the load 401 is an AC load, the slave BM 105 is connected to the DC/AC inverter 107 and the DC/AC inverter 107 is connected to the battery module 108 and the load 401. The slave BM 105 is connected via a wire or wirelessly to the DC/AC inverter 107 to transmit and receive control signals to and from the DC/AC inverter 107. The DC/AC inverter 107 is connected to the battery module 108 and the load 401 to exchange power with each of the battery module 108 and the load 401. In an example, the DC/AC inverter 107 is designed to have a voltage range of 100 V to 220 V, and thus the auxiliary battery unit 103 has a wide voltage range by the DC/AC inverter 107 and the DC/DC converter 106.

The slave BM 105 controls the DC/AC inverter 107 to supply a power output from the battery module 108 to the load 401. The DC/AC inverter 107 supplies the power output from the battery module 108 to the load 401 using a rated voltage of the load 401. In an example, the DC/AC inverter 107 includes output ports with different voltages. The DC/AC inverter 107 is controlled by the slave BM 105 to use an output port with the rated voltage of the load 401.

Figure 5:
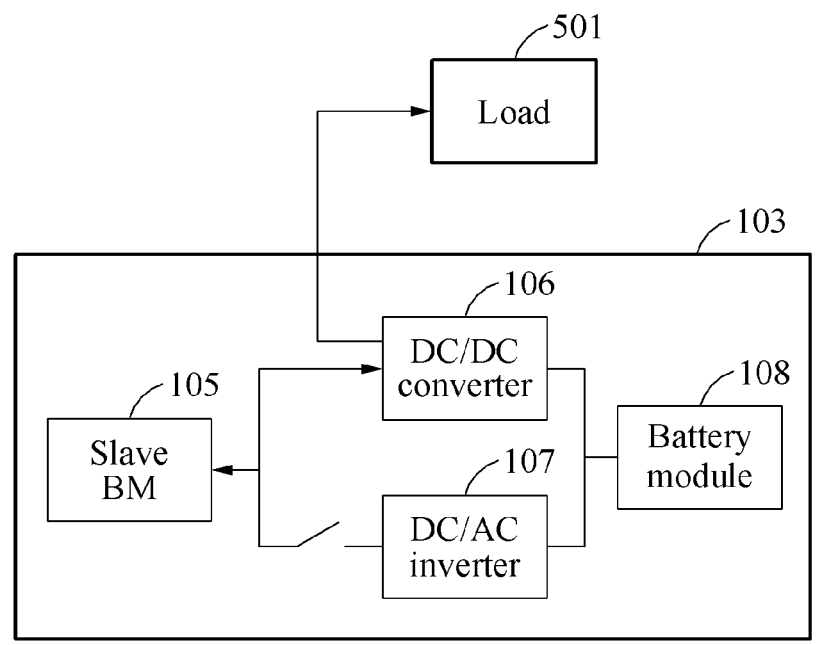
FIG. 5 is a diagram illustrating an example of the auxiliary battery unit.

FIG. 5 illustrates an example of the auxiliary battery unit 103.

The auxiliary battery unit 103 is utilized as an ESS and supplies a power to a DC load. Referring to FIG. 5, when the auxiliary battery unit 103 is connected to a load 501 and when the load 501 is a DC load, the slave BM 105 is connected to the DC/DC converter 106 and the DC/DC converter 106 is connected to the battery module 108 and the load 501. The slave BM 105 is connected via a wire or wirelessly to the DC/DC converter 106 to transmit and receive control signals to and from the DC/DC converter 106. The DC/DC converter 106 is connected to the battery module 108 and the load 501 to exchange power with each of the battery module 108 and the load 501.

The slave BM 105 controls the DC/DC converter 106 to supply a power output from the battery module 108 to the load 501. The DC/DC converter 106 supplies the power output from the battery module 108 to the load 501 using a rated voltage of the load 501. Also, the DC/DC converter 106 includes output ports with different voltages. The DC/DC converter 106 is controlled by the slave BM 105 to use an output port with the rated voltage of the load 501. For example, when the DC/DC converter 106 includes an output port OP1 (not shown) for 5 V, an output port OP2 (not shown) for 12 V, an output port OP3 (not shown) for 24 V and an output port OP4 (not shown) for 48 V, and when the load 501 has a rated voltage of 12 V, the DC/DC converter 106 is connected to the load 501 via the output port OP2 and supplies the power output from the battery module 108 to the load 501. When the auxiliary battery unit 103 is included in the EV, the auxiliary battery unit 103 is used as a power source to supply a variable power to a motor of the EV. When the auxiliary battery unit 103 is removed from the EV as shown in FIGS. 4 and 5, the auxiliary battery unit 103 operates as an ESS to supply a power to an electrical product, such as, for example, a portable refrigerator or a speaker.

Figure 6:
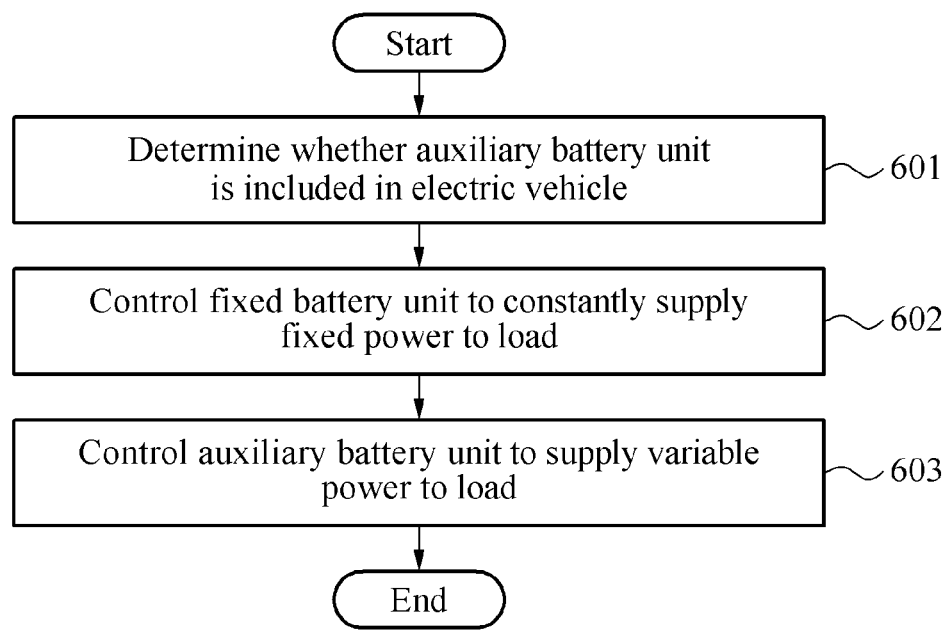
FIG. 6 is a diagram illustrating an example of a battery control method.

FIG. 6 illustrates an example of a battery control method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the above descriptions of FIGS. 1-5, are also applicable to FIG. 6, and are incorporated herein by reference. Thus, the above description may not be repeated here.

Referring to FIG. 6, in 601, a battery operating apparatus determines whether an auxiliary battery unit is included in an EV. The auxiliary battery unit may be included in or removed from the EV. For example, a master BM included in the battery operating apparatus determines whether the auxiliary battery unit is included in the EV. The master BM is configured to control a battery, and is implemented as, for example, a hardware module.

When the auxiliary battery unit is included in the EV, in 602, the battery operating apparatus controls a fixed battery unit to supply a fixed power to a load. In 603, the battery operating apparatus controls the auxiliary battery unit to supply a variable power to the load. When the auxiliary battery unit is removed from the EV, the battery operating apparatus controls the fixed battery unit to supply the fixed power and the variable power to the load.

The master BM 101, slave BM 109, slave BM 105, and other apparatuses, units, modules, devices, and other components illustrated in FIGS. 1, 2, 4 and 5 that perform the operations described in this application are implemented by hardware components. Examples of hardware components include controllers, sensors, generators, drivers, and any other electronic components known to one of ordinary skill in the art. In one example, the hardware components are implemented by one or more processors or computers. Examples of hardware components that may be used to perform the operations described in this application where appropriate include controllers, sensors, generators, drivers, memories, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery operating apparatus comprising:
    a master battery manager (BM);
    a fixed battery unit configured to supply a fixed power to a load, the fixed power remaining unchanged over time; and
    a removable auxiliary battery unit configured to supply a variable power to the load, the variable power varying over time,
    wherein the master BM is configured to control the fixed battery unit to supply the fixed power among a power needed by the load, and to control the auxiliary battery unit to supply the variable power among the power needed by the load, and
    wherein the master BM is further configured to control the fixed battery unit to supply the fixed power and the variable power to the load, in response to the removable auxiliary battery unit being absent.

2. A battery operating apparatus comprising:
    a master battery manager (BM);
    a fixed battery unit configured to supply a fixed power to a load, the fixed power remaining unchanged over time; and
    a removable auxiliary battery unit configured to supply a variable power to the load, the variable power varying over time,
    wherein the master BM is configured to control the fixed battery unit to supply the fixed power among a power needed by the load, and to control the auxiliary battery unit to supply the variable power among the power needed by the load,
    wherein the load comprises a motor of an electric vehicle (EV), and
    wherein the master BM is further configured to:
        control the auxiliary battery unit to discharge a power used to accelerate the EV,
        control the auxiliary battery unit to perform charging with a power generated by decelerating the EV, and
        control the fixed battery unit to discharge a power at a c-rate disregarding the accelerating and the decelerating of the EV.

3. The battery operating apparatus of claim 2, wherein the master BM is further configured to adjust the c-rate based on a speed of the EV.

4. A battery operating apparatus comprising:
a master battery manager (BM);
a fixed battery unit configured to supply a fixed power to a load, the fixed power remaining unchanged over time; and
a removable auxiliary battery unit configured to supply a variable power to the load, the variable power varying over time,
wherein the master BM is configured to control the fixed battery unit to supply the fixed power among a power needed by the load, and to control the auxiliary battery unit to supply the variable power among the power needed by the load,
wherein the auxiliary battery unit comprises:
a slave BM;
a direct current (DC)-to-DC (DC/DC) converter;
a DC-to-alternating current (AC) (DC/AC) inverter; and
a battery module, and
wherein in response to the master BM determining that the removable auxiliary battery unit is included in an electric vehicle (EV),
the slave BM is connected to the master BM and the DC/DC converter,
the DC/DC converter is connected to the battery module and the load, and
the slave BM is configured to control the DC/DC converter to supply a power output from the battery module to the load.

5. The battery operating apparatus of claim 4, wherein the DC/DC converter is configured to supply the power output from the battery module to the load using a voltage of the fixed battery unit.

6. The battery operating apparatus of claim 4, wherein the DC/DC converter comprises output ports with different voltages, and the DC/DC converter is configured to supply the power output from the battery module to the load using an output port with a voltage of the fixed battery unit.

7. The battery operating apparatus of claim 4, wherein in response to the master BM determining that the removable auxiliary battery unit is removed from the EV and connected to an AC load,
the slave BM is connected to the DC/AC inverter,
the DC/AC inverter is connected to the battery module and the second load,
the slave BM is further configured to control the DC/AC inverter to supply the power output from the battery module to the AC load, and
the DC/AC inverter is configured to supply the power output from the battery module to the AC load using a rated voltage of the AC load.

8. The battery operating apparatus of claim 4, wherein the DC/DC converter comprises output ports with different voltages, and
wherein in response to the master BM determining that the removable the auxiliary battery unit is removed from the EV and connected to a DC load,
the slave BM is connected to the DC/DC converter,
the DC/DC converter is connected to the battery module and the second load,
the slave BM is further configured to control the DC/DC converter to supply the power output from the battery module to the DC load, and
the DC/DC converter is configured to supply the power output from the battery module to the DC load using an output port with a rated voltage of the DC load.

9. A battery operating apparatus comprising:
a master battery manager (BM);
a fixed battery unit configured to supply a fixed power to a load, the fixed power remaining unchanged over time; and
a removable auxiliary battery unit configured to supply a variable power to the load, the variable power varying over time,
wherein the master BM is configured to control the fixed battery unit to supply the fixed power among a power needed by the load, and to control the auxiliary battery unit to supply the variable power among the power needed by the load, and
wherein in response to the master BM determining that the removable auxiliary battery unit is included in an electric vehicle (EV), the removable auxiliary battery unit is further configured to supply a power to a heating apparatus configured to maintain a temperature of the fixed battery unit to be higher than or equal to a threshold.

10. A removable auxiliary battery unit comprising:
a slave battery management system (BM);
a direct current (DC)-to-DC (DC/DC) converter;
a DC-to-alternating current (AC) (DC/AC) inverter; and
a battery module, and
wherein in response to the auxiliary battery unit being included in an electric vehicle (EV),
the slave BM is connected to the DC/DC converter and a master BM of a battery operating apparatus of the EV,
the DC/DC converter is connected to the battery module and a load of the EV, and
the slave BM is configured to control the DC/DC converter to supply a variable power to the load, the variable varying over time.

11. The auxiliary battery unit of claim 10, wherein the DC/DC converter is configured to supply a power output from the battery module to the load using a voltage of a fixed battery unit of the EV.

12. The auxiliary battery unit of claim 10, wherein the master BM is configured to control a fixed battery unit of the EV to supply a fixed power to the load, the fixed power remaining unchanged over time.

13. The auxiliary battery unit of claim 10, wherein the load comprises a motor of the EV,
wherein the slave BM is further configured to:
control the DC/DC converter to supply a power used to accelerate the EV; and
control the DC/DC converter to perform charging with a power generated by decelerating the EV, and
wherein the master BM is configured to control a fixed battery unit of the EV to discharge a power at a c-rate disregarding the accelerating and the decelerating of the EV.

14. The auxiliary battery unit of claim 10, wherein the DC/DC converter comprises output ports with different voltages, and the DC/DC converter is configured to supply a power output from the battery module to the load using an output port with a voltage of a fixed battery unit of the EV.

15. The auxiliary battery unit of claim 10, wherein in response to the master BM determining that the removable auxiliary battery unit is removed from the EV and connected to an AC load, the slave BM is connected to the DC/AC inverter, the DC/AC inverter is connected to the battery module and the second load, the slave BM is further configured to control the DC/AC inverter to supply a power output from the battery module to the AC load, and the DC/AC inverter is configured to supply the power output from the battery module to the AC load using a rated voltage of the AC load.

16. The auxiliary battery unit of claim 10, wherein the DC/DC converter comprises output ports with different voltages, and wherein in response to the master BM determining that the removable auxiliary battery unit is removed from the EV and connected to a DC load, the slave BM is connected to the DC/DC converter, the DC/DC converter is connected to the battery module and the second load, the slave BM is further configured to control the DC/DC converter to supply a power output from the battery module to the DC load, and the DC/DC converter is configured to supply the power output from the battery module to the DC load using an output port with a rated voltage of the DC load.

17. The auxiliary battery unit of claim 10, wherein in response to the master BM determining that the removable auxiliary battery unit is included in the EV, the slave BM is further configured to control the DC/DC converter to supply a power to a heating apparatus configured to maintain a temperature of a fixed battery unit of the EV to be higher than or equal to a threshold.

18. A battery control method comprising:

determining whether a removable auxiliary battery unit is included in an electric vehicle (EV);

controlling a fixed battery unit to supply a fixed power to a load, the fixed power remaining unchanged over time among a power needed by the load;

controlling the auxiliary battery unit to supply a variable power to the load, the variable power varying over time among the power needed by the load, in response to the removable auxiliary battery unit being included in the EV; and controlling the fixed battery unit to supply the fixed power and the variable power to the load, in response to the removable auxiliary battery unit not being included in the EV.

19. A non-transitory computer-readable storage medium storing instructions to cause a processor to perform the method of claim 18.

* * * * *